United States Patent [19]

Ozawa et al.

[11] Patent Number: 5,787,847
[45] Date of Patent: Aug. 4, 1998

[54] OIL SUPPLY SYSTEM FOR A PLANING TYPE BOAT

[75] Inventors: Shigeyuki Ozawa; Ryoichi Nakase; Keiichi Hiki, all of Iwata, Japan

[73] Assignee: Yamaha Hatsudoki Kabushiki Kaisha, Shizuoka-ken, Japan

[21] Appl. No.: 757,196

[22] Filed: Nov. 27, 1996

[30] Foreign Application Priority Data

Nov. 28, 1995 [JP] Japan .................................. 7-309367

[51] Int. Cl.⁶ .................................................. F02B 33/04
[52] U.S. Cl. .................................. 123/73 AD; 123/196 R
[58] Field of Search .......................... 123/73 AD, 196 R, 123/196 M, 196 W

[56] References Cited

U.S. PATENT DOCUMENTS 4,480,602  11/1984  Kobayashi et al. ............... 123/73 AD
5,511,524   4/1996  Kidera et al. ..................... 123/73 AD

*Primary Examiner*—David A. Okonsky
*Attorney, Agent, or Firm*—Knobbe, Martens, Olson & Bear

[57] ABSTRACT

An oil supply system for a watercraft which is powered by an internal combustion engine driving a water propulsion device is disclosed. The system delivers oil to the engine in accordance with a first rate of increase as engine speed increases in a first low engine speed range, and in accordance with a second higher rate of increase as engine speed increases in a second engine speed range higher than the first engine speed range. The lower rate of oil delivery in the first engine speed range is selected to prevent fouling of a catalyst of the engine.

19 Claims, 7 Drawing Sheets

OIL SUPPLY SYSTEM FOR A PLANING TYPE BOAT

FIELD OF THE INVENTION

The present invention relates to an oil supply system for a two-cycle engine, and more specifically, to such a system which controls the amount of oil supplied to the engine.

BACKGROUND OF THE INVENTION

Use of catalytic converters with engines used to power automobiles are well known. These converters generally comprise a honeycomb structure positioned within an outer housing. The honeycomb structure is coated with platinum and rhodium. Exhaust gas from the engine is routed into the converter housing to the coated honeycomb structure. There, catalysis occurs, whereby carbon monoxide and hydrocarbons are oxidized to form carbon dioxide and water, and oxides of nitrogen are reduced to form nitrogen.

Catalytic converts are also used with two-cycle engines used to power watercraft. Conversion of exhaust gases from these engines is especially important because the exhaust gases therefrom are typically routed into the water. The exhaust gas may react with the water to form acids and other undesirable compounds, and may also be released from the water to the atmosphere.

A problem arises, however, with use of catalytic converters in these watercraft engines. In these engines, lubricating oil is mixed with the fuel and introduced into the combustion chambers of the engine. The amount of lubricating oil supplied to the engine is proportional to the engine speed. When lubricating oil is supplied to the engine in this manner, instances arise when the lubricating oil passes through the combustion chambers of the engine in large quantities unburned. This oil may clog or foul the catalyst. The fouling problem is compounded when the exhaust gas and/or catalyst is at a low temperature and the lubricating oil passing through the combustion chambers readily remains thereon. This fouling of the catalyst prevents efficient catalysis of the exhaust gas and may ruin the catalyst completely.

A means for providing the correct amount of lubricating oil to the combustion chambers of a two-cycle internal combustion engine for preventing fouling of an exhaust catalyst of the engine is desired.

SUMMARY OF THE INVENTION

In accordance with the present invention, there is provided an oil supply system for controlling the amount of oil delivered to an internal combustion engine having at least one variable volume combustion chamber, an exhaust passage leading from said chamber with a catalyst therein, and an output shaft for driving a water propulsion device. The system includes an oil tank or supply in communication with the engine, and means for controlling oil flow rate to the engine.

Preferably, the means for controlling the oil flow rate controls the rate of increase of the oil delivery rate to the engine as engine speed increases in a first engine speed operating range in accordance with a first rate. The means for controlling controls the rate of increase in the oil delivery rate as the engine speed increases in a second engine speed range in accordance with a second rate, where the second speed range is higher than the first and the second rate is higher than the first.

In accordance with a further aspect of the invention, the control means controls the flow rate to increase in accordance with a third rate when the temperature of the catalyst is determined to be at least the catalyst activation temperature.

The oil delivery system of the present invention advantageously provides the proper amount of oil to the engine while reducing the risk of catalyst fouling.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

In accordance with the present invention, there is provided an oil supply system for a planing type watercraft or boat.

Figure 1:
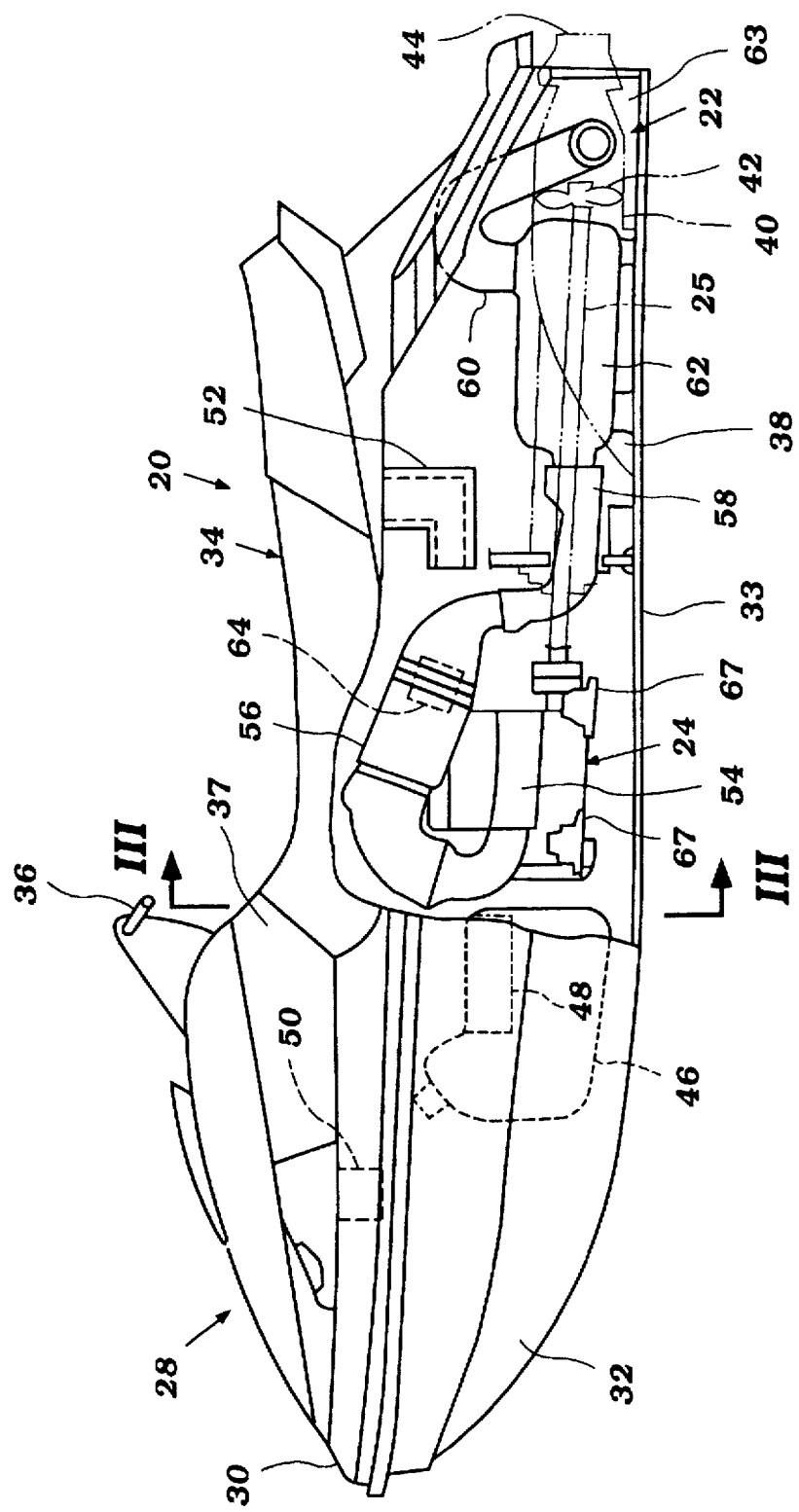
FIG. 1 is a side view, partially broken away, of a watercraft having an engine powering a propulsion unit, the engine including an oil supply system in accordance with the present invention.

FIG. 1 illustrates a watercraft 20 of the jet propulsion type wherein the watercraft sucks in water through an intake and ejects it rearward. The watercraft 20 includes a propulsion unit 22 for propelling the water, the propulsion unit powered by an engine 24 of the type which includes an oil supply system 26 in accordance with the present invention.

In general, the watercraft 20 includes a hull 28 having a top portion 30 and a lower portion 32. A seat 34 is positioned on the top portion 30 of the hull 28. A steering handle 36 is provided adjacent the seat 34 for use by a user in directing the watercraft 20.

Figure 2:
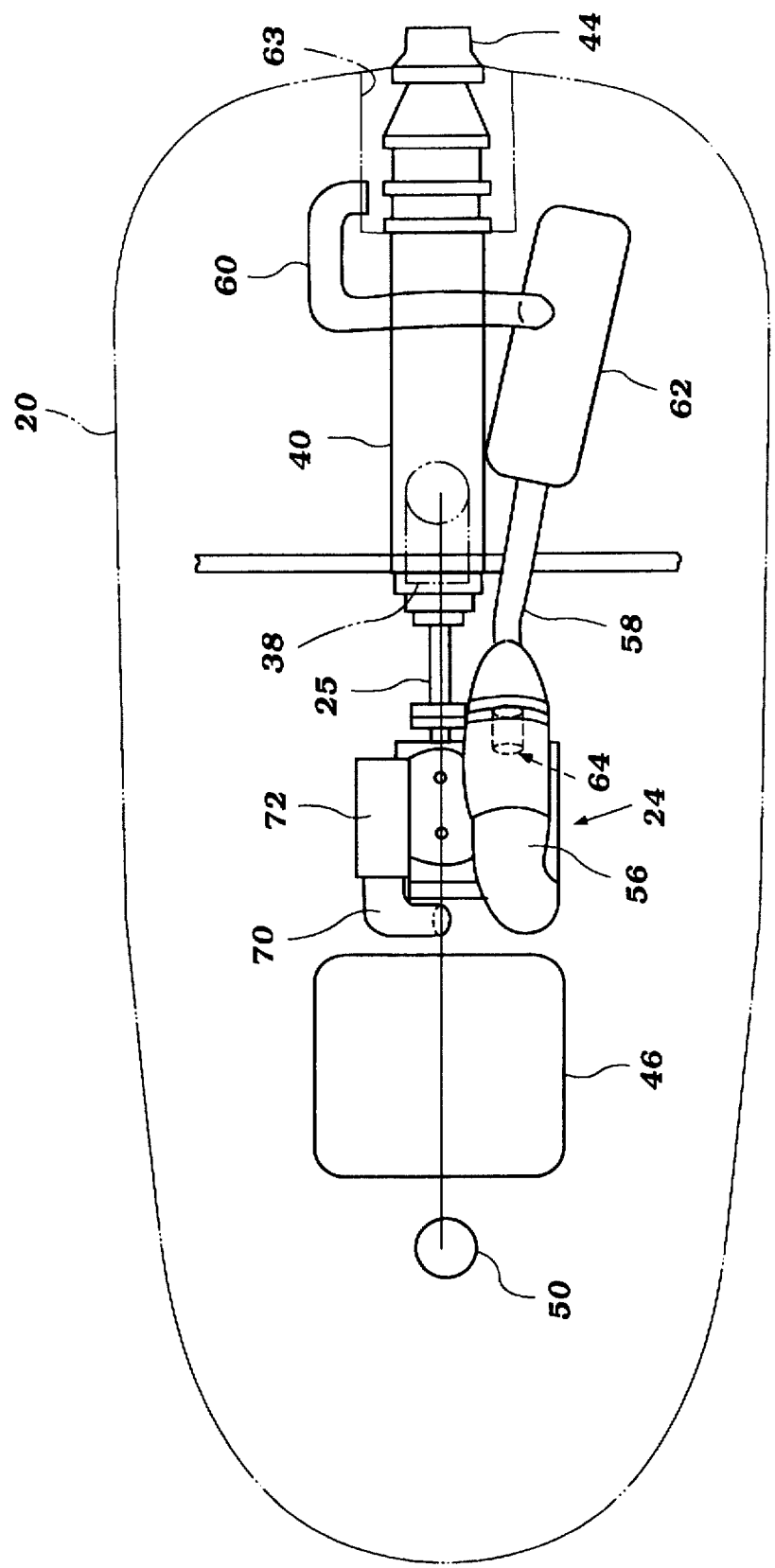
FIG. 2 is a top view of the engine and propulsion system of the watercraft illustrated in FIG. 1.

The hull 28 defines therein an interior space in which is positioned the engine 24. As illustrated in FIGS. 1 and 2, the engine 24 has an output shaft 25 which rotationally drives the propulsion unit 22 which extends out a rear end of the lower portion 32 of the hull 28. The lower portion 32 of the hull 28 includes a intake port 38 which is in communication, via a passage 40 of the propulsion unit 22 in which an impeller 42 is disposed, with a nozzle 44. The nozzle 44 is mounted for movement up and down and to the left and right, whereby the direction of the propulsion force for the watercraft 20 may be varied.

Fuel is supplied to the engine 24 from a fuel tank 46 positioned within the hull 28 of the watercraft 20 forward of the engine 24. An oil tank 48 is similarly situated. Fuel is supplied from the fuel tank 46 to the engine 24 through an appropriate fuel line (not shown).

A combustion air supply is also provided to the engine 24 for use in the fuel combustion process. Outside air is routed through a pair of ducts 50, 52 to the engine 24.

Figure 3:
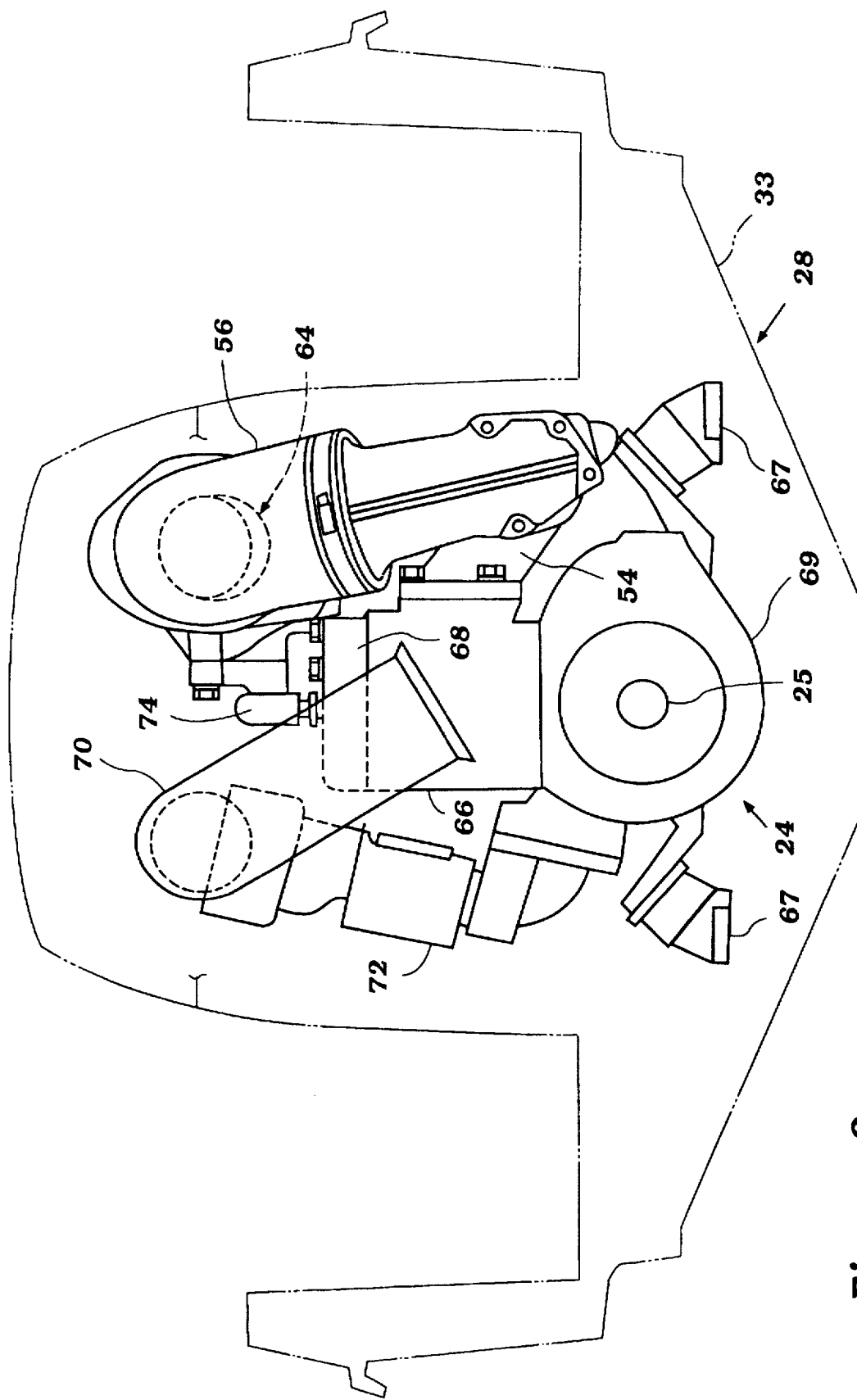
FIG. 3 is a front view of the engine of the watercraft taken along line III—III of FIG. 1.

As illustrated in FIGS. 1, 2 and 3, exhaust gas generated by the engine 24 is routed from the engine to an exhaust manifold 54. The exhaust manifold 54 extends to an expansion pipe 56 (see also FIG. 4), which in turn is connected to front and rear exhaust pipes 58,60. Between the exhaust pipes 58,60 is positioned a water lock 62. The rear exhaust pipe 60 opens into the water through a pump chamber in which the passage 40 is disposed.

Figure 4:
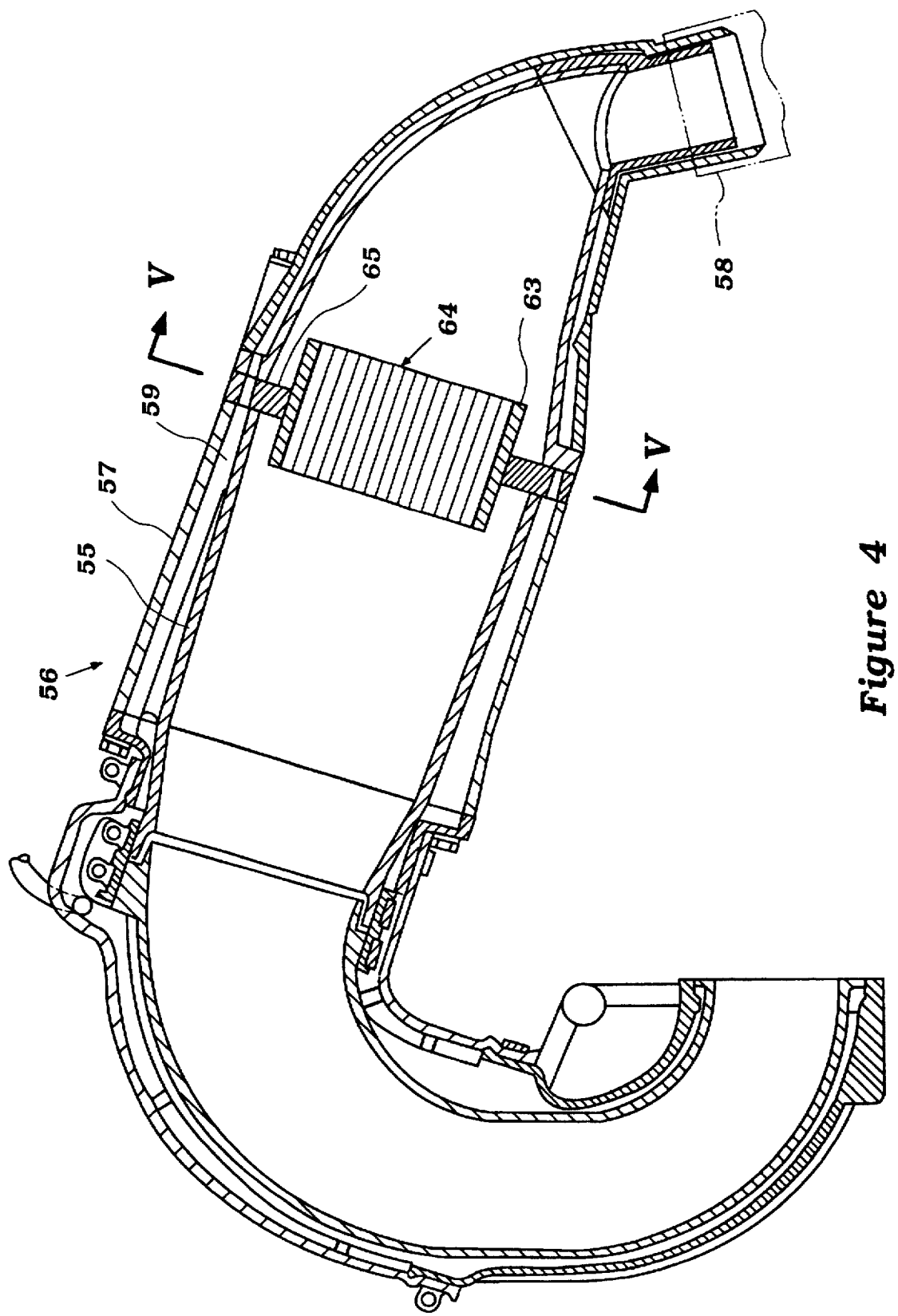
FIG. 4 is a cross-sectional view of an exhaust pipe and exhaust expansion pipe of the engine of the watercraft illustrated in FIG. 1.
Figure 5:
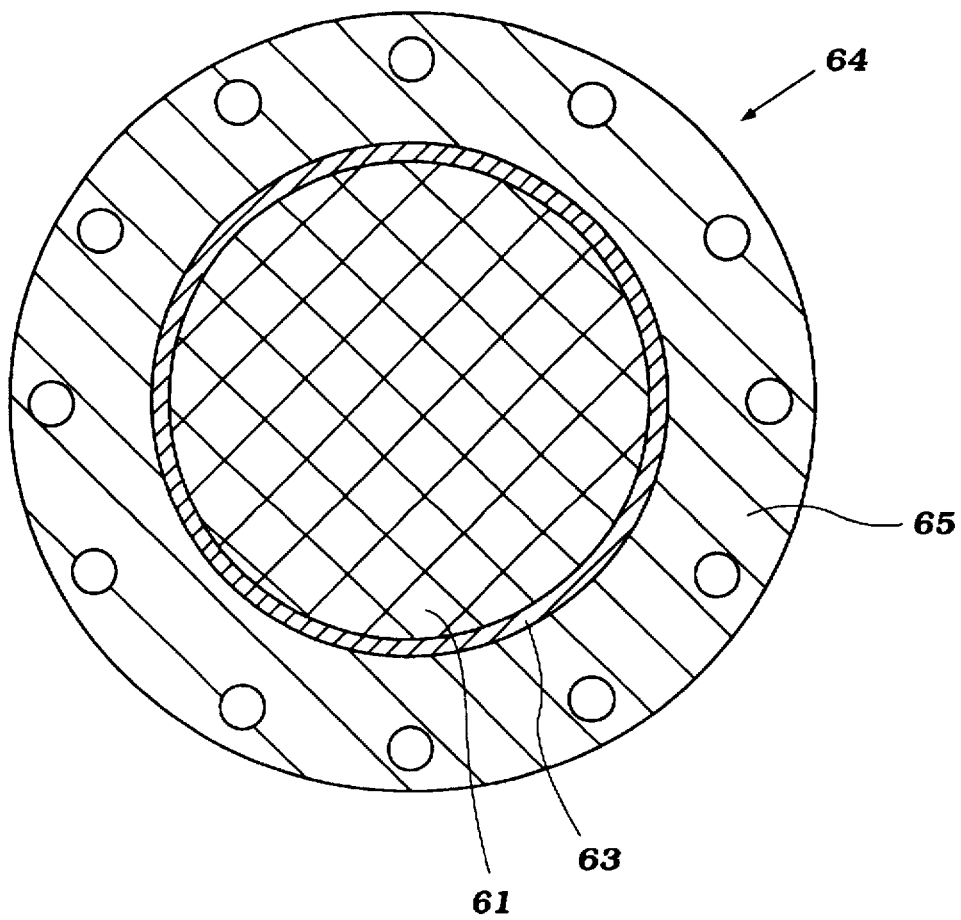
FIG. 5 is a cross-sectional view of the exhaust expansion pipe illustrated in FIG. 4 and taken along line V—V therein.

As illustrated in FIGS. 1, 4 and 5, a catalyst 64 is positioned within the expansion pipe 56 for converting the certain of the exhaust gas products. The catalyst 64 is a honeycomb-type catalyst bed 61 positioned within a shell 63. The shell 63 is supported by an annual flange 65.

The expansion pipe 56 has an outer wall 55 which is positioned within a wall 57 of a water jacket. The wall 57 of the water jacket and the wall 55 of the expansion pipe 56 define therebetween a passage 59 through which cooling water flows. Through-holes extend through the flange 65 supporting the catalyst 64 for allowing cooling water to flow through the cooling water passage 59.

As illustrated in FIGS. 1, 2 and 3, the engine 24 is preferably of the three-cylinder, two-cycle variety. One skilled in the art will appreciate that the oil supply system 26 of the present invention may be adapted for use with engines of other types and configurations.

The engine 24 has a block 66 having a head 68 connected thereto. The block 66 is connected to a bottom portion 33 of the lower portion 32 of the hull 28 via dampeners 67. The engine 24 is accessible through an engine hatch 37.

The engine block 66 and head 68 define three variable volume combustion chambers. Each chamber preferably comprises a cylinder having a piston (not shown) movably mounted therein. Each piston is connected by a connecting rod to a crankshaft positioned within a crankcase chamber 69, the crankshaft journalled to the block 66 at a front end thereof, and arranged to drive the output shaft 25 at the second end thereof. As is well known in two-cycle engines, the crankcase is divided into chambers corresponding to each combustion chamber, each crankcase chamber in communication with its respective combustion chamber.

An ignition element 74 is provided for igniting an air/fuel charge in each combustion chamber.

As best illustrated in FIG. 2, the outside air which is drawn into the ducts 50,52 enters the engine through an air pipe 70. The air pipe 70 is connected to an intake manifold 72 which leads to individual engine intake passages 76, one each of which communicates with each crankcase chamber. Reed valves (not shown) are positioned within each intake passage 76. Each reed valve automatically opens to introduce intake air when the pressure within the crankcase chamber is low when the piston ascends, and closes to prevent air from escaping the crankcase chamber when the pressure therein is raised by the piston's decent.

A carburetor (not shown) is provided for introducing fuel into the incoming air passing through each intake passage 76 leading to each combustion chamber. Each carburetor has a butterfly-type throttle valve positioned downstream of a venturi thereof for varying the intake passage's 76 cross-sectional area, and thus the volume of air passing therethrough.

The position of each throttle valve is controlled, via a linkage, by an operating cable (not shown). The opposite end of the operating cable is attached to a throttle control lever (not shown) mounted on the steering handle 36, whereby the operator of the watercraft 20 may open and close the valve with the lever.

Figure 6:
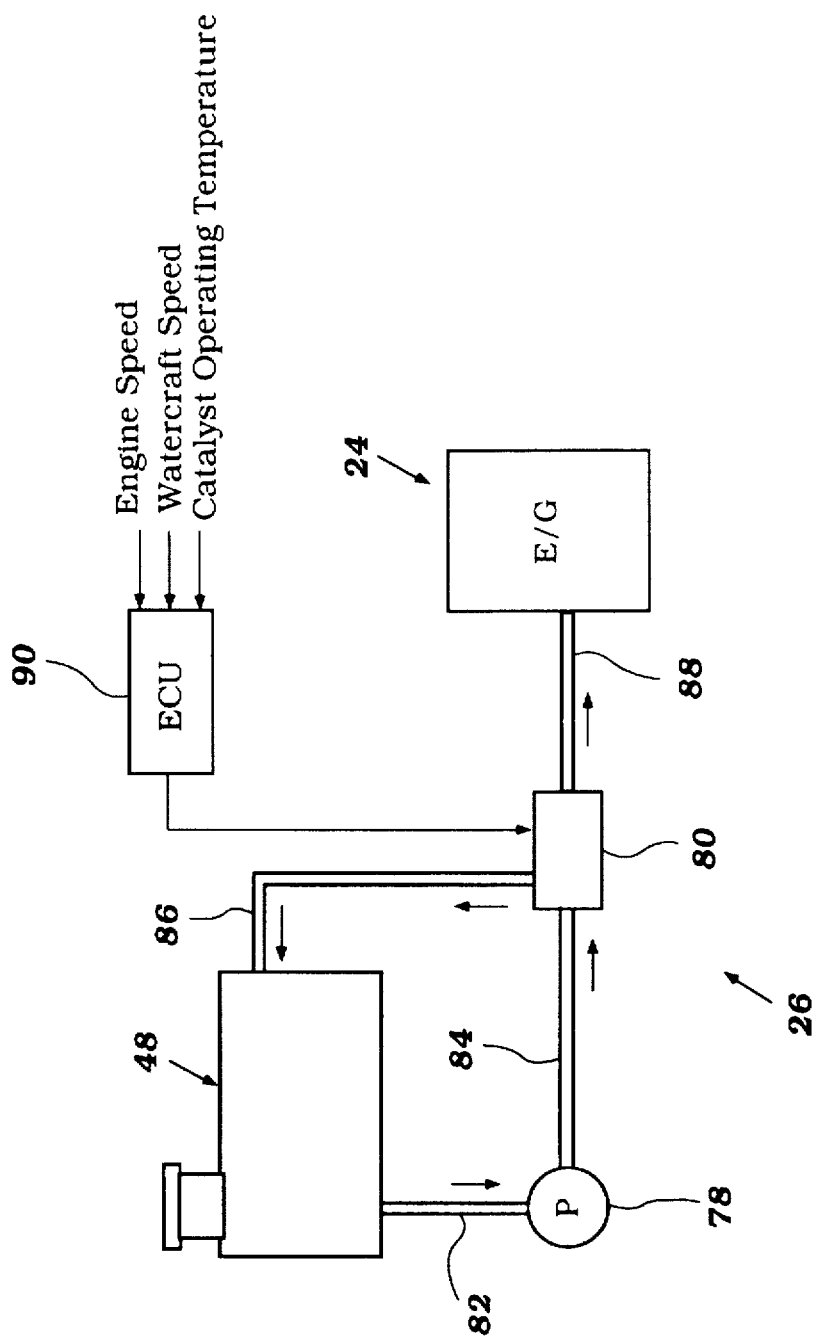
FIG. 6 is a schematic illustrating the oil supply system of the present invention.

In accordance with the present invention, the engine 24 includes an oil supply system 26 for delivering oil to the engine for both lubrication and mixing with the fuel, as is well known to those skilled in the art with respect to these types of engines. FIG. 6 best illustrates the oil supply system 26, which preferably includes the oil tank 48, an oil pump 78, and a valve 80. A first oil line 82 extends between the tank 48 and the pump 78. A second oil line 84 extends between the pump 78 and the valve 80. A return line 86 extends between the valve 80 and the tank 48, while a feed line 88 extends between the valve 80 and the engine 24.

Preferably, the engine 24 includes an electronic control unit (ECU) 90. Data such as engine speed, watercraft velocity, catalyst operating temperature and the like are inputted to the ECU 90 for use in controlling certain engine functions. In accordance with the present invention, the ECU 90 controls the valve 80. The ECU 80 controls the position of the valve 80 to control the amount of lubricating oil supplied to the engine 24 through the delivery line 88. In the event it is determined a large quantity of oil should be delivered to the engine 24, the ECU 90 is arranged to open and close the valve 80 in accordance with a "duty cycle" by which the flow rate of oil to the engine 24 is controlled. In particular, the ECU 90 maintains the valve 80 in an open position for long periods of time in order to allow large quantities of oil to flow to the engine, and shuts the valve 80 between intermittent open phases to reduce the volume of oil delivered to the engine. When the valve 80 is closed, oil delivered thereto is diverted back to the oil tank 48 through the return line 86. This arrangement is similar to that of U.S. Pat. No. 5,511,524, which is incorporated herein by reference.

Figure 7B:
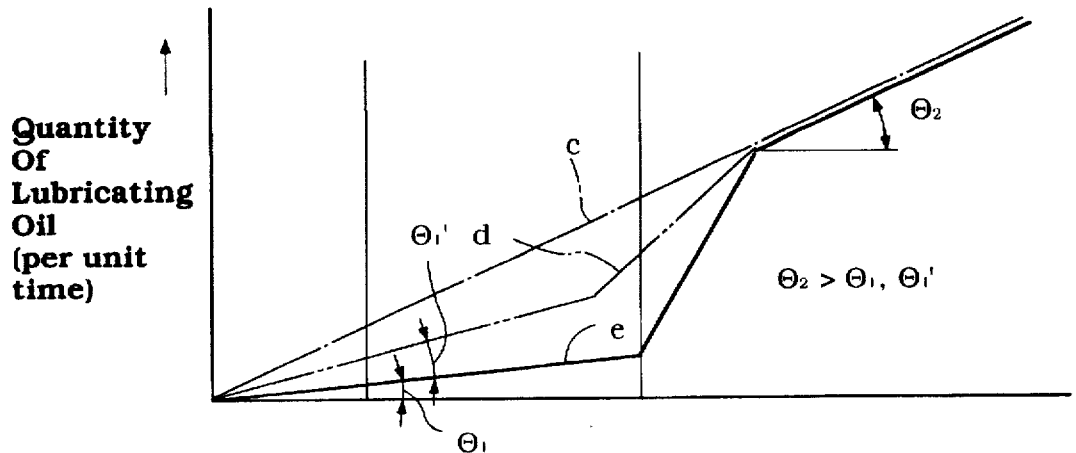
FIG 7(b) is a graph illustrating propeller and impeller load or torque and the resistance of the watercraft versus engine and watercraft speed.

In accordance with the lubricating oil supply system 26 of the present invention, the volume of lubricating oil supplied to the engine 24 is specifically varied. As best illustrated in FIG. 7(b), the resistance of the watercraft in the water rises to a hump velocity and then drops as the watercraft attains a planing velocity, before rising again as the watercraft achieves higher velocities above planing speed. In addition, the load upon the impeller 42 rises as the velocity of the watercraft increases, as illustrated by line I therein. The impeller 42 "absorbs" a certain amount of energy in effectuating its rotation. This energy absorption rate rises exponentially as a factor of rotation speed. Thus, where the impeller 42 is rotated by the output shaft of the engine, as engine speed increases, the total load on the engine increases exponentially as a result of the increased load thereon from the impeller. As such, at lower speeds, the amount of engine power required is much lower than at higher impeller (and thus engine) speeds. In accordance with the present invention, the delivery rate of lubricating oil is advantageously varied from a standard "proportional to engine speed" arrangement in order to correctly provide lubricant oil when the load upon the engine varies as indicated above.

Figure 7A:
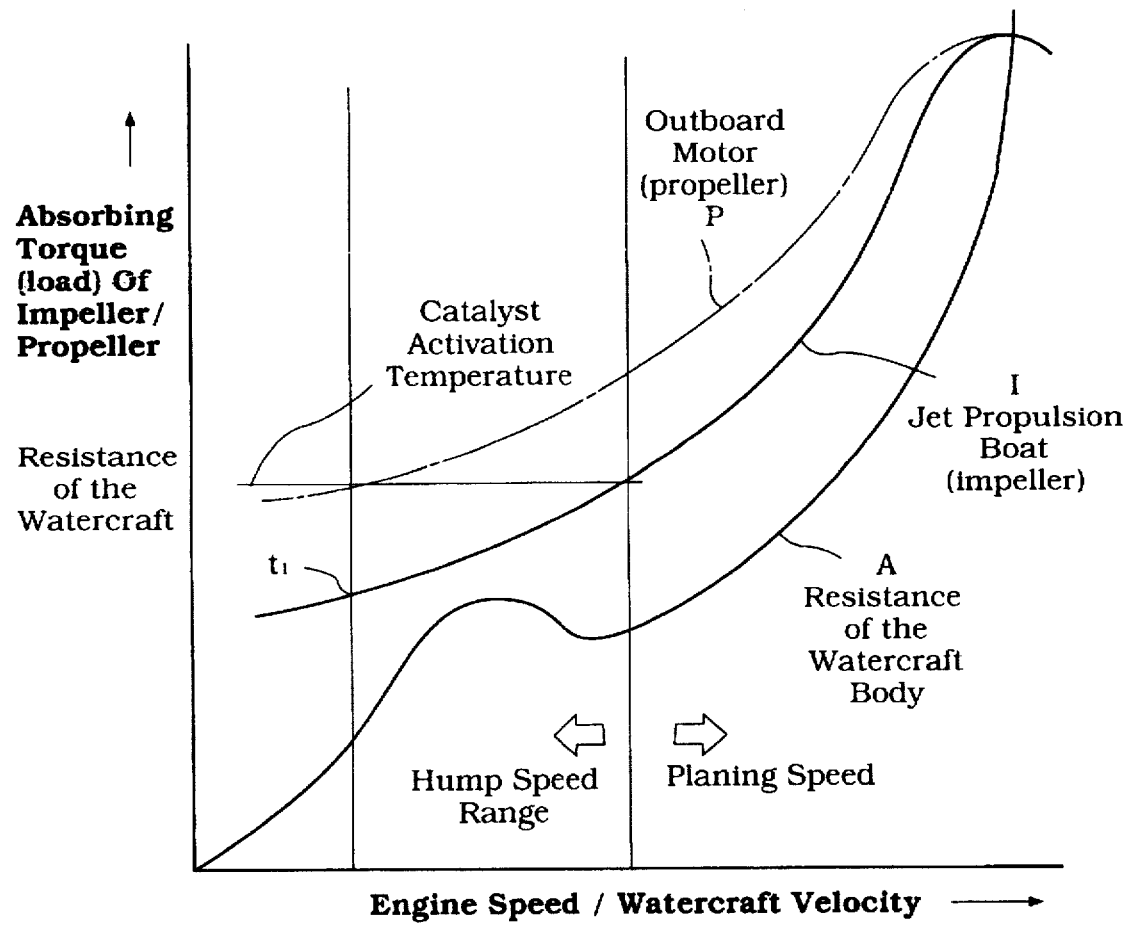
FIG. 7(a) is graph illustrating quantity of lubricating oil supplied versus engine speed in accordance with the present invention.

FIG. 7(a) illustrates various lubricating oil volumes supplied to the engine 24 as compared to engine speed. In accordance with a first aspect of the system 26 of the present invention, the ECU 90 reads the engine and watercraft speed and sets a lubricating oil reference amount in proportion to engine speed, as illustrated by line c in FIG. 7(b). This lubricant delivery is such that no lubricant is delivered when the engine speed is zero, and is maximum when the engine speed is maximum, with the volume of lubricating oil delivered to the engine per unit time increasing therebetween by a linear ratio amount θ2 as engine speed increases.

In accordance with the present invention, the lubricant delivery may be varied from this reference amount. Namely, if the ECU 90 determines that the engine speed is within the range of speed corresponding to the watercraft's hump speed range and less than planing speed (labelled "b" in FIG. 7(a)), then the volume of lubricating oil supplied to the engine 24 by the system 26 is as illustrated by line e in FIG. 7(a). As illustrated therein, when the engine is operating in this speed range, the amount of lubricating oil supplied to the engine 24 per unit time is increased by a ratio amount θ1 which is less than the reference increase θ2. The lubrication oil delivery volume is achieved by the ECU's 90 control of the valve 80 described above.

In accordance with this aspect of the system 26 of the present invention, the volume of lubricating oil supplied to the engine 24 so selected prevents the lubricating oil from fouling the catalyst 64.

Once the engine speed exceeds that corresponding to the hump speed range, e.g. 3500 rpm in the present invention, then the ECU 90 instructs the lubricating oil delivery rate to be increased at an increased rate until it is increased at the rate in accordance with the reference line c in FIG. 7(b).

As a further aspect of the present invention, in the event the ECU 90 measures the catalyst temperature (for example, by data received from a temperature sensor) and this temperature is determined to be at least as great as a minimum desired catalyst operating temperature, the lubricating oil volume delivered to the engine 24 is determined from line c of FIG. 7(b). In particular, if the catalyst temperature is, for example, 300° C., such that the risk of catalyst fouling is reduced, then the system 26 of the present invention delivers the increasing amount of lubricating oil as illustrated by line c.

If the engine 24 is utilized to power a propeller of an outboard motor as opposed to an impeller of a jet-powered watercraft, the volume of lubricating oil supplied the engine 24 is preferably similarly limited. FIG. 7(a) illustrates the load upon the propeller of a watercraft as compared to engine speed and watercraft velocity. In accordance with the present invention, in this arrangement, the system 26 operates to provide lubricating oil at a rate in accordance with the line d of FIG. 7(b) when the engine is operating in the hump speed range and below planing speed. Again, this rate of lubricating oil delivery θ1' is less than the rate θ2. Once the engine/watercraft speed is sufficiently high, the lubricating oil delivery rate is increased as illustrated therein to the normal increase reference rate as indicated by line c.

Further, if the catalyst temperature is found to be above the minimum desired operating temperature or if the engine speed increases beyond that corresponding to the hump speed range and past planing speed, the rate of lubricating oil delivery is again increased to the engine in accordance with the rate of line c.

Of course, the foregoing description is that of preferred embodiments of the invention, and various changes and modifications may be made without departing from the spirit and scope of the invention, as defined by the appended claims.

What is claimed is:

1. In combination, a watercraft and an engine powering a water propulsion device for moving said watercraft, said engine having at least one variable combustion chamber which, when combustion occurs therein, drives a movable member connected to an output shaft, said output shaft connected to said propulsion device, and further including an oil delivery system for delivering oil from an oil supply, said delivery system including, an oil line extending between said oil supply and said engine, a pump for pumping oil from said oil supply tank through said line to said engine, and means for controlling the rate of oil delivery to said engine wherein said rate of oil delivery to said engine increases in accordance with a first rate in a first engine speed range below a watercraft planing speed, and in accordance with a second rate higher than said first rate only if said engine speed exceeds a second engine speed corresponding to a watercraft speed at or above a watercraft planing speed.

2. The combination in accordance with claim 1, wherein watercraft is a boat and said propulsion device comprises a propeller.

3. The combination in accordance with claim 1, wherein said watercraft is a jet-propelled watercraft and said propulsion device is an impeller.

4. The combination in accordance with claim 1, wherein said first and second rates are proportional to engine speed.

5. The combination in accordance with claim 1, wherein said means for controlling includes valve means positioned along said oil delivery line for controlling the volume of oil delivered through said line.

6. The combination in accordance with claim 5, further including a return line extending from said valve back to said oil tank and wherein excess oil delivered to said valve means but not delivered through said delivery line to said engine is returned to said tank through said return line.

7. In combination, a watercraft and an engine powering a water propulsion device for moving said watercraft, said engine having at least one variable combustion chamber which, when combustion occurs therein, drives a movable member connected to an output shaft, said output shaft connected to said propulsion device, and further including an oil delivery system, said delivery system including an oil tank, an oil line extending between said oil tank and said engine, a pump for pumping oil from said tank through said line to said engine, and means for controlling the rate of oil delivery to said engine wherein said rate of oil delivery to said engine increases in accordance with a first rate in a first engine speed range, and in accordance with a second rate in a second engine speed range, said second rate being greater than said first rate said engine further including an exhaust passage leading from said combustion chamber and a catalyst for interaction with exhaust passing through said passage, and wherein said means for controlling increases the rate of oil delivery in said first operating speed range to said second rate if said catalyst has a temperature at or above a predetermined catalyst activation temperature.

8. The combination in accordance with claim 7, wherein said first and second rates are proportional to engine speed.

9. The combination in accordance with claim 7, wherein said means for controlling comprises a valve positioned along said oil line.

10. A lubricating oil delivery system for an internal combustion engine powering an output shaft which drives a water propulsion device, said engine including an exhaust passage leading from said combustion chamber and a catalyst for converting gases passing through said chamber, said system including an oil delivery line through which oil may flow from an oil supply to said engine, a pump for pumping oil through said line to said engine, and means for controlling the rate of lubricating oil delivery such that the rate of increase in lubricating oil volume delivered to said engine is larger when said engine is operating in a first operating speed range than when said engine is operating in a second operating speed range and for controlling the rate of oil delivery in said second engine operating speed range to be the same as in said first operating speed range when said catalyst has a temperature which is at or above a catalyst activating temperature.

11. The lubricating oil delivery system in accordance with claim 10, wherein said means for controlling includes valve means positioned along said delivery line for controlling the volume of oil passing through said line to said engine.

12. The lubricating oil delivery system in accordance with claim 11, further including a return line extending from said valve means back to said tank, through which excess oil delivered to said valve but not delivered through said delivery line to said engine is routed back to said tank.

13. The lubricating oil delivery system in accordance with claim 11, wherein said means for controlling includes an engine control unit for operating said valve.

14. The lubricating oil system in accordance with claim 10, wherein said water propulsion device is a propeller.

15. The lubricating oil system in accordance with claim 10, wherein said water propulsion device is a water jet-propulsion unit.

16. A method for delivering oil to an internal combustion engine having at least one variable volume combustion chamber, means movably mounted in said chamber for movement in response to combustion in said chamber, said means coupled to an output shaft of said engine, output shaft driving a water propulsion device, an exhaust passage leading from said combustion chamber and a catalyst for interaction with exhaust gases flowing through said exhaust passage, and an oil supply and means for delivering oil from said supply to said engine, comprising the steps of: determining the speed of said engine, controlling the rate of increase in the volume of said oil delivered to said engine in accordance with a first rate of increase as said engine speed increases in a first engine operating speed range, and controlling the rate of increase in the volume of said oil delivered to said engine in accordance with a second rate of increase as said engine speed increases in a second operating speed range greater than said first operating speed range, said second rate of increase being greater than in said first rate of increase, comparing said measured speed of said engine to said first and second operating speed ranges, delivering oil to said engine in accordance with said rate corresponding to the operating speed range in which said engine is operating and measuring the temperature of said catalyst and controlling the rate of delivery increase in accordance with said second rate of increase if said temperature of said catalyst is above a catalyst activation temperature, even if said engine speed is within said first operating speed range.

17. The method in accordance with claim 16, wherein said means for delivering oil to said engine comprises an oil delivery line extending from said tank to said engine, and further including valve means positioned along said delivery line, and wherein said controlling steps comprise controlling the position of said valve means to control the amount of oil flowing through said line to said engine.

18. A method for delivering oil to an internal combustion engine having at least one variable volume combustion chamber, means movably mounted in said chamber for movement in response to combustion in said chamber, said means coupled to an output shaft of said engine, output shaft driving a water propulsion device of a watercraft, an exhaust passage leading from said combustion chamber and a catalyst for interaction with exhaust gases flowing through said exhaust passage, and an oil supply system including means for delivering oil from an oil supply to said engine, comprising the steps of: determining the speed of said engine, controlling the rate of increase in the volume of said oil delivered to said engine in accordance with a first rate of increase if said engine speed is in a first engine speed range below an engine speed corresponding to a watercraft planing speed and controlling the rate of increase in the volume of said oil delivered to said engine in accordance with a second rate of increase if said engine speed increases to a second operating speed range at or above said watercraft planing speed, said second rate of increase being greater than in said first rate of increase.

19. The method in accordance with claim 18, wherein an exhaust passage leads from said combustion chamber and including a catalyst for interaction with exhaust gases flowing through the exhaust passage, and further including the step of measuring the temperature of said catalyst and controlling the rate of delivery increase in accordance with said second rate of increase if said temperature of said catalyst is above a catalyst activation temperature, even if said engine speed is within said first operating speed range.

* * * * *